(12) United States Patent

Gurevich

(10) Patent No.: US 12,630,107 B1

(45) Date of Patent: May 19, 2026

(54) CURTAIN AIRBAG SYSTEM

(71) Applicant: GM GLOBAL TECHNOLOGY OPERATIONS LLC, Detroit, MI (US)

(72) Inventor: Aleksandr Gurevich, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/040,254

(22) Filed: Jan. 29, 2025

(51) Int. Cl.

| | |
|---|---|
| *B60R 21/232* | (2011.01) |
| *B60R 21/201* | (2011.01) |
| *B60R 21/2338* | (2011.01) |
| *B60R 21/237* | (2006.01) |
| *B60R 21/235* | (2006.01) |

(52) U.S. Cl.

CPC .......... *B60R 21/232* (2013.01); *B60R 21/201* (2013.01); *B60R 21/2338* (2013.01); *B60R 21/237* (2013.01); *B60R 2021/23386* (2013.01); *B60R 2021/23538* (2013.01)

(58) Field of Classification Search

CPC . B60R 21/232; B60R 21/2338; B60R 21/213; B60R 21/201; B60R 21/237; B60R 21/23138; B60R 21/214; B60R 21/215; B60R 2021/23386; B60R 2021/23538; B60R 2021/21537; B60R 2021/23192

USPC .......... 280/728.1, 728.2, 730.1, 730.2, 743.2

See application file for complete search history.

(56) References Cited

U.S. PATENT DOCUMENTS

| | | | | |
|---|---|---|---|---|
| 10,654,438 | B2 * | 5/2020 | Iwata .................... | B60R 21/237 |
| 2006/0043703 | A1 * | 3/2006 | Enriquez ............... | B60R 21/213 |
| | | | | 280/730.2 |
| 2010/0207367 | A1 * | 8/2010 | Weyrich ................ | B60R 21/237 |
| | | | | 280/730.2 |
| 2013/0093167 | A1 * | 4/2013 | Volkmann ............. | B60R 21/232 |
| | | | | 280/729 |
| 2014/0265266 | A1 * | 9/2014 | Kemp ................... | B60R 21/231 |
| | | | | 280/728.2 |
| 2015/0239415 | A1 * | 8/2015 | Tsujimoto ............... | B60R 21/20 |
| | | | | 280/728.2 |

(Continued)

FOREIGN PATENT DOCUMENTS

| | | | | | |
|---|---|---|---|---|---|
| JP | 6450544 | B2 * | 1/2019 | | |
| KR | 20180000402 | A * | 1/2018 | ........... | B60R 21/237 |

(Continued)

*Primary Examiner* — Keith J Frisby

(74) *Attorney, Agent, or Firm* — Quinn IP Law

(57) ABSTRACT

A curtain airbag system includes a rolled airbag cushion having a plurality of cushion tabs arranged along a length of the rolled airbag cushion, a first multifunction strap arranged at a first location along the length of the rolled airbag cushion, and a second multifunction strap arranged at a second location along the length of the rolled airbag cushion. The rolled airbag cushion includes a first longitudinal portion arranged at least partially within the first multifunction strap, and a second longitudinal portion arranged at least partially within the second multifunction strap. The first multifunction strap includes a first plurality of multifunction strap tabs, and a first multifunction strap attachment. The second multifunction strap includes a second plurality of multifunction strap tabs, and a second multifunction strap attachment. Each of the first multifunction strap and the second multifunction strap is attached to the folded airbag cushion, in part, via sewing.

20 Claims, 3 Drawing Sheets

(56) References Cited

U.S. PATENT DOCUMENTS

2017/0247008 A1*  8/2017  Witt, Jr. ................ B60R 21/213
2017/0327073 A1*  11/2017  Arima ................... B60R 13/025
2021/0253056 A1  8/2021  Ichimura et al.
2022/0024403 A1*  1/2022  Kosten .................. B60R 21/201
2023/0024450 A1*  1/2023  DiTrapani ............. B60R 21/213
2023/0055794 A1*  2/2023  Moran .................. B60R 21/232
2023/0182675 A1*  6/2023  Crawford ............. B60R 21/201
                                        280/730.2

FOREIGN PATENT DOCUMENTS

KR        20190035109 A  *  4/2019  ....... B60R 21/23138
KR        20240162240 A  *  11/2024  ........... B60R 21/235

* cited by examiner

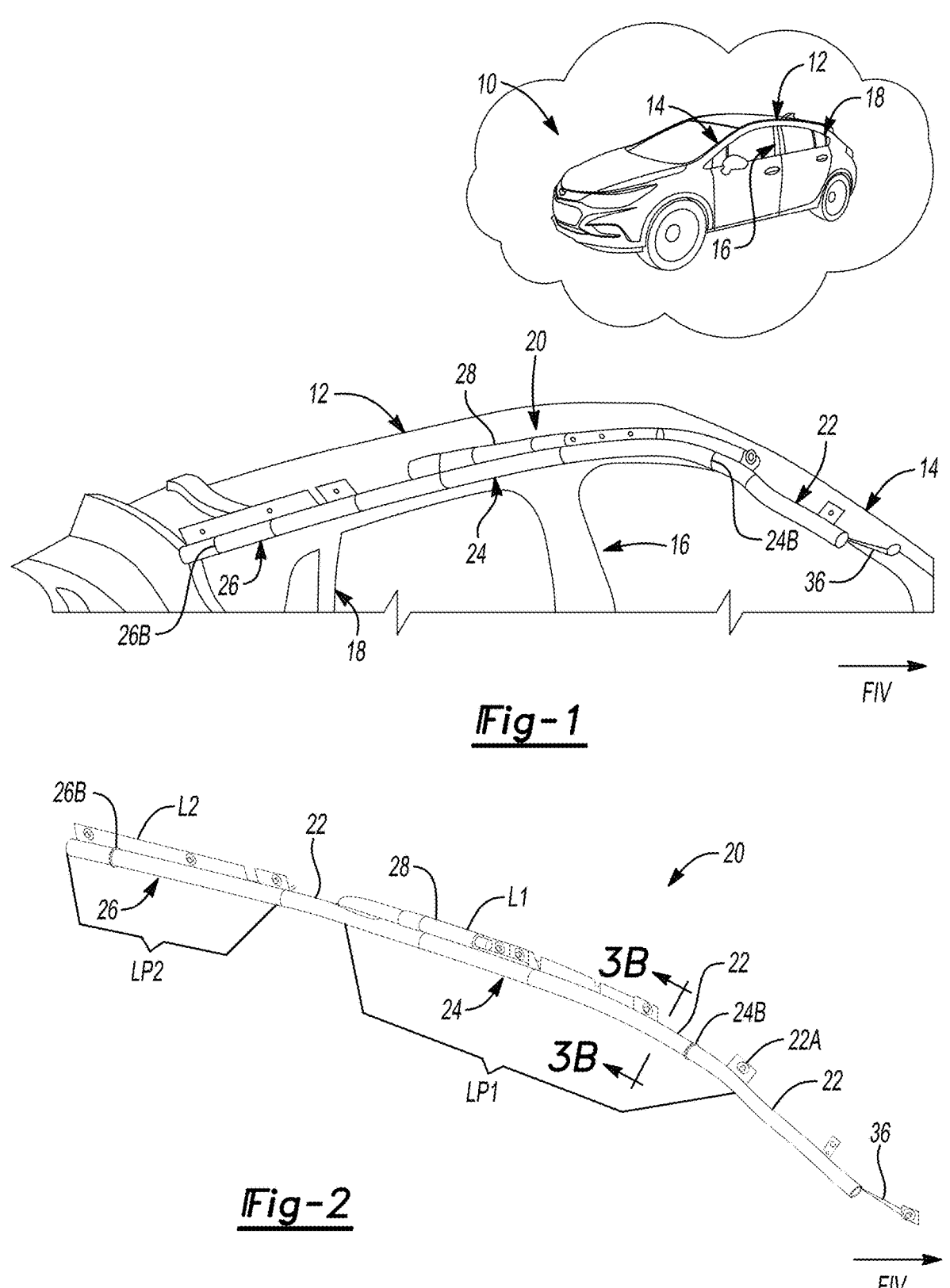
_Fig-1_
_Fig-2_

24A, 26A 24A-2, 26A-2

32A, 32B

31A 30A, 30B 32A, 32B

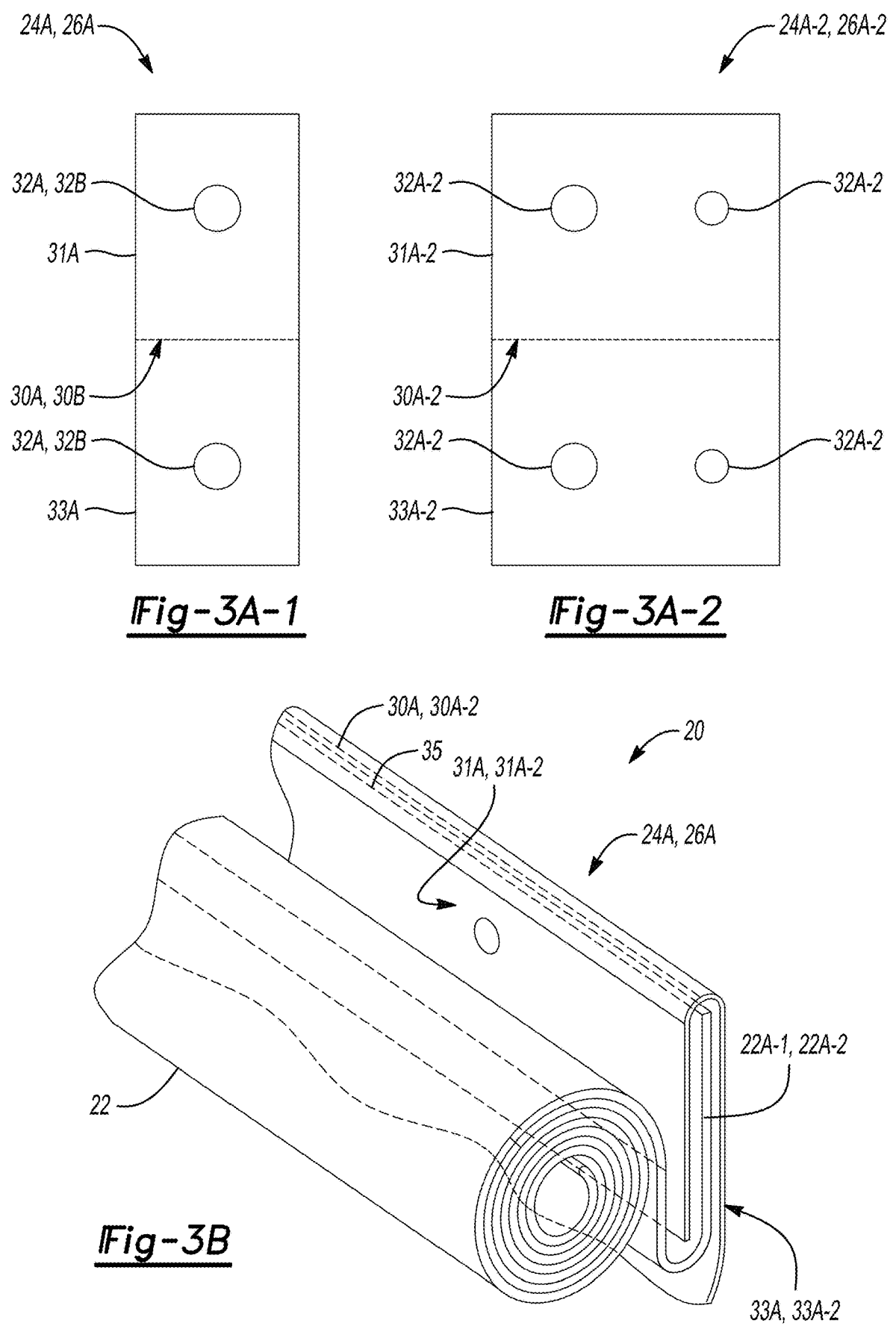

33A

_Fig-3A-1_

32A-2

31A-2

30A-2

32A-2

33A-2

32A-2

32A-2

_Fig-3A-2_

30A, 30A-2

35    31A, 31A-2

20

24A, 26A

22

22A-1, 22A-2

33A, 33A-2

_Fig-3B_

CURTAIN AIRBAG SYSTEM

INTRODUCTION

The concepts described herein relate generally to occupant restraint systems for motorized vehicles. More specifically, aspects of this disclosure relate to curtain airbag assemblies for vehicles.

Many passenger vehicles, as part of an overall occupant restraint system, employ a supplemental inflatable restraint (STR) system with inflatable airbags. An airbag system includes an inflatable airbag cushion, and an inflator, which releases airbag gas causing the airbag cushion to deploy into the vehicle passenger compartment.

The airbag assembly may be mounted to, for example but not limited to, a steering wheel hub (e.g., for driver-side airbags), behind a vehicle instrument panel (IP) (e.g., for passenger-side airbags), or inside a vehicle seat assembly, side door trim, or headliner trim mounted (e.g., curtain airbags).

Curtain airbag systems or assemblies generally include an airbag cushion, an inflator, inflator brackets, attachment fasteners, ramp bracket(s), tab stiffeners, twist prevention features, fastener retention washers, and fabric patches.

The airbag cushion is rolled into a circular shape and mounted to an upper portion or roof rail of the vehicle at various locations by fabric tabs sandwiched between stiffeners (tab stiffeners) attached along the roof rail.

B-pillar and C-pillar deployment ramps serve to guide the airbag cushion over edges of garnish trim during deployment of the curtain airbags.

The tab stiffeners aid in assembly and proper routing of the curtain airbag system on the vehicle during installation. The twist prevention features provide assembly error proofing. The fastener retention washers keep fasteners arranged within airbag tabs during shipping and handling, while fabric patches protect the airbag cushion during deployment.

SUMMARY

It is useful to develop a curtain airbag system including a multifunction strap that combines the functions of a plastic ramp, tab stiffeners, twist prevention features, fastener retention washers, and fabric patches or cushion tabs into the multifunction strap.

According to one aspect of the disclosure, a curtain airbag system for a vehicle having a roof rail, an A-pillar, a B-pillar, and a C-pillar may include a rolled airbag cushion mounted to the roof rail via fasteners.

The rolled airbag cushion includes a plurality of cushion tabs, which may be arranged along a length of the rolled airbag cushion, a first multifunction strap, and a second multifunction strap. The first multifunction strap may be arranged at a first location along the length of the rolled airbag cushion. The second multifunction strap may be arranged at a second location along the length of the rolled airbag cushion.

An inflator may be arranged adjacent to the airbag cushion.

The first multifunction strap of the curtain airbag system may be mounted adjacent to the B-pillar, while the second multifunction strap of the curtain airbag system may be mounted adjacent to the C-pillar.

The first multifunction strap may include a first plurality of multifunction strap tabs, and a first multifunction strap attachment. The second multifunction strap may include a second plurality of multifunction strap tabs, and a second multifunction strap attachment.

The first multifunction strap may include a B-pillar ramp portion, and the second multifunction strap may include a C-pillar ramp portion. The B-pillar ramp portion, which may be integrated into the first multifunction strap to facilitate over garnish trim deployment, may be wrapped around the rolled airbag cushion adjacent to the B-pillar, while the C-pillar ramp portion, which may be integrated into the second multifunction strap, may be wrapped around the rolled airbag cushion adjacent to the C-pillar.

The rolled airbag cushion may include a first longitudinal portion, and a second longitudinal portion. The first longitudinal portion of the rolled airbag cushion may be arranged at least partially within the first multifunction strap, while the second longitudinal portion of the rolled airbag cushion may be arranged at least partially within the second multifunction strap.

The plurality of cushion tabs may include a first plurality of cushion tabs arranged along the first longitudinal portion of the rolled airbag cushion, and a second plurality of cushion tabs may be arranged along the second longitudinal portion of the rolled airbag cushion.

Each of the first plurality of cushion tabs may be arranged adjacent to a respective one of the first plurality of multifunction strap tabs. Each of the second plurality of cushion tabs may be arranged adjacent to a respective one of the second plurality of multifunction strap tabs.

The first plurality of multifunction strap tabs may include a first portion, a second portion, and a first perforated hinge, which may be arranged between the first portion and the second portion of each of the first plurality of multifunction tabs. Each of the first plurality of cushion tabs may be arranged between the first portion and the second portion of the respective one of the first plurality of multifunction strap tabs.

The second plurality of multifunction strap tabs may include a first portion, a second portion, and a second perforated hinge, which may be arranged between the first portion and the second portion of each of the second plurality of multifunction tabs. Each of the second plurality of cushion tabs may be arranged between the first portion and the second portion of the respective one of the second plurality of multifunction strap tabs.

The first portion and the second portion of each of the first plurality of multifunction strap tabs, and the respective one of the first plurality of cushion tabs may include a first fastener opening extending through the first portion and the second portion of each of the first plurality of multifunction strap tabs.

The first portion and the second portion of each of the second plurality of multifunction strap tabs, and the respective one of the second plurality of cushion tabs may include a second fastener opening extending through the first portion and the second portion of each of the second plurality of multifunction strap tabs.

A fastener may be arranged within each of the first fastener openings and the second fastener openings, while a fastener retention washer may be arranged to retain each of the fasteners within each of the first fastener openings and the second fastener openings.

Each of the first plurality of multifunction strap tabs may be folded along a respective one of first perforated hinges, while each of the second plurality of multifunction strap tabs may be folded along a respective one of the second perforated hinges.

Each of the first multifunction strap and the second multifunction strap may be attached to the folded airbag cushion, at least in part, via sewing.

Each of the first multifunction strap attachment and the second multifunction strap attachment may include a tape.

According to another aspect of the disclosure, a curtain airbag system for a vehicle may include a rolled airbag cushion having a plurality of cushion tabs, which may be arranged along a length of the rolled airbag cushion.

The rolled airbag cushion may include an outer non-inflatable portion having an upper airbag selvage portion, an inner inflatable portion, which may be arranged within the outer non-inflatable portion, a first multifunction strap, a second multifunction strap, an inflator, and an A-pillar tether anchor.

The plurality of cushion tabs may extend from the upper airbag selvage portion.

The first multifunction strap may be arranged at a first location along the length of the rolled airbag cushion, and may include a first plurality of multifunction strap tabs, an inflator attachment feature, and a first multifunction strap attachment.

The second multifunction strap may be arranged at a second location along the length of the rolled airbag cushion, and may include a second plurality of multifunction strap tabs, and a second multifunction strap attachment.

The inflator may be arranged adjacent to the inflator attachment feature of the rolled airbag cushion, while the A-pillar tether anchor may extend from a front end of the curtain airbag assembly.

The A-pillar tether anchor may be configured for attachment to an A-pillar of the vehicle.

The rolled airbag cushion may include a first longitudinal portion, and a second longitudinal portion. The first longitudinal portion may be arranged at least partially within the first multifunction strap, while the second longitudinal portion may be arranged at least partially within the second multifunction strap.

Each of the first multifunction strap and the second multifunction strap may be attached to the folded airbag cushion, at least in part, via sewing.

Each of the first multifunction strap attachment and the second multifunction strap attachment may include a tape.

A vehicle including a curtain airbag system is also disclosed herein.

The curtain airbag system may include a rolled airbag cushion, a first multifunction strap, and a second multifunction strap.

The rolled curtain airbag cushion may have a plurality of cushion tabs arranged along a length of the rolled airbag cushion.

The first multifunction strap may be arranged at a first location along the length of the rolled airbag cushion, while the second multifunction strap may be arranged at a second location along the length of the rolled airbag cushion.

The first multifunction strap may include a first plurality of multifunction strap tabs, and a first multifunction strap attachment.

The second multifunction strap may include a second plurality of multifunction strap tabs, and a second multifunction strap attachment.

The rolled airbag cushion may include a first longitudinal portion, and a second longitudinal portion. The first longitudinal portion of the rolled airbag cushion may be arranged at least partially within the first multifunction strap, while the second longitudinal portion of the rolled airbag cushion may be arranged at least partially within the second multifunction strap.

The plurality of cushion tabs may include a first plurality of cushion tabs, and a second plurality of cushion tabs.

The first plurality of cushion tabs may be arranged along the first longitudinal portion of the rolled airbag cushion, such that each of the first plurality of cushion tabs may be arranged adjacent to a respective one of the first plurality of multifunction strap tabs.

The second plurality of cushion tabs may be arranged along the second longitudinal portion of the rolled airbag cushion, such that each of the second plurality of cushion tabs may be arranged adjacent to a respective one of the second plurality of multifunction strap tabs.

The first plurality of multifunction strap tabs may include a first portion, a second portion, and a first perforated hinge, which may be arranged between the first portion and the second portion of each of the first plurality of multifunction tabs. Each of the first plurality of cushion tabs may be arranged between the first portion and the second portion of the respective one of the first plurality of multifunction strap tabs.

The second plurality of multifunction strap tabs may include a first portion, a second portion, and a second perforated hinge, which may be arranged between the first portion and the second portion of each of the second plurality of multifunction tabs. Each of the second plurality of cushion tabs may be arranged between the first portion and the second portion of the respective one of the second plurality of multifunction strap tabs.

The first portion and the second portion of each of the first plurality of multifunction strap tabs, and the respective one of the first plurality of cushion tabs may include a first fastener opening, which may extend through the first portion and the second portion of each of the first plurality of multifunction strap tabs.

The first portion and the second portion of each of the second plurality of multifunction strap tabs, and the respective one of the second plurality of cushion tabs may include a second fastener opening, which may extend through the first portion and the second portion of each of the second plurality of multifunction strap tabs.

A fastener may be arranged within each of the first fastener openings and the second fastener openings, while a fastener retention washer may be arranged to retain each of the fasteners within each of the first fastener openings and the second fastener openings.

Each of the first multifunction strap attachment and the second multifunction strap attachment may include a tape.

By providing a curtain airbag system including a multifunction strap that combines the functions of a plastic ramp, tab stiffeners, twist prevention features, fastener retention washers, and fabric patches or cushion tabs into the multifunction strap, complexity of the curtain airbag system is reduced while ensuring proper airbag cushion deployment over the garnish trim, facilitating error-proof installation and providing assembly aid for secure one-handed screw operation at the vehicle assembly plant, protecting airbag cushion fabric from damage, and retaining fasteners during curtain airbag system assembly, shipping and handling.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

FIG. 1 is a schematic illustration of a side portion inside a vehicle passenger cabin including a curtain airbag system in accordance with the present disclosure.

FIG. 2 is a schematic isometric illustration of a curtain airbag system in accordance with the present disclosure.

FIG. 3A-1 is a schematic front view illustration of a multifunction strap tab, encircled at A in FIG. 3, in accordance with one aspect of the present disclosure.

FIG. 3A-2 is a schematic front view illustration of a multifunction strap tab, encircled at A in FIG. 3, in accordance with another aspect of the present disclosure.

FIG. 3B is a schematic side view illustration of a folded airbag cushion shown in FIG. 2 in accordance with the present disclosure.

Figures 2A, 3:
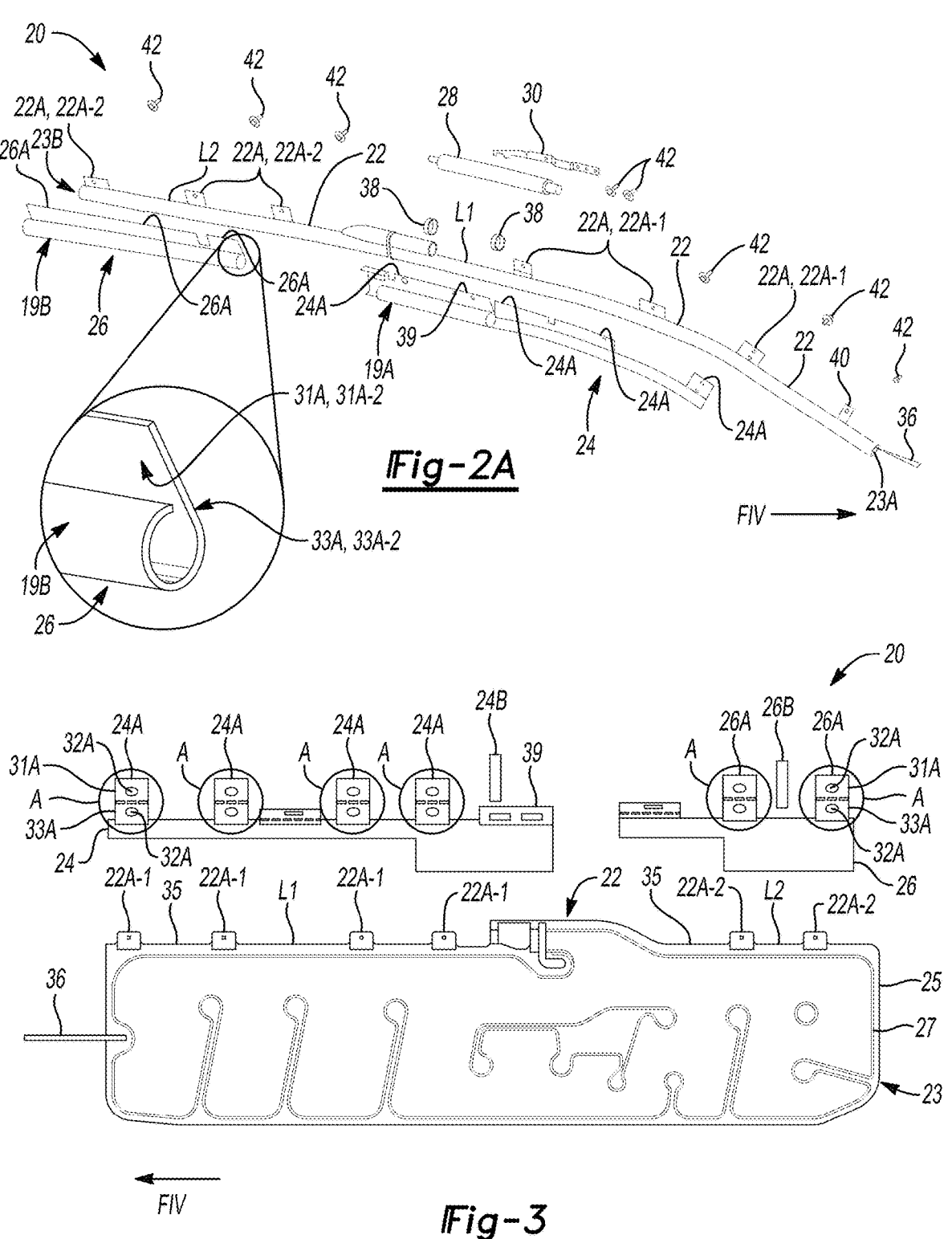
FIG. 2A is an exploded schematic isometric illustration of the curtain airbag system shown in FIG. 2 in accordance with the present disclosure.
FIG. 3 is a schematic sectional side view illustration of a curtain airbag system in accordance with the present disclosure.

The appended drawings are not necessarily to scale, and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

Referring now to the drawings, wherein like reference numerals refer to like parts or features throughout several views, there is shown in FIG. 1 a side portion inside of a passenger cabin of a representative vehicle, which is designated generally at 10 and portrayed herein for purposes of discussion as a sedan-style passenger vehicle. It should be appreciated, however, that the vehicle 10 may include, but is not limited to, a commercial vehicle, an industrial vehicle, a passenger vehicle, an aircraft, a watercraft, a train or the like.

According to one aspect of the disclosure, as illustrated in FIG. 1, a curtain airbag system 20 for a vehicle 10 having a roof rail 12, an A-pillar 14, a B-pillar 16, and a C-pillar 18. The curtain airbag system 20 is mounted to the roof rail 12 via fasteners 42. The curtain airbag assembly 20 includes a rolled airbag cushion 22, a first multifunction strap 24, and a second multifunction strap 26. An inflator 28 is arranged adjacent to the airbag cushion 22.

The first multifunction strap 24 of the curtain airbag system 20 is mounted adjacent to the B-pillar 16, while the second multifunction strap 26 of the curtain airbag system 20 is mounted adjacent to the C-pillar 18.

Each of the first multifunction strap 24 including the first plurality of multifunction strap tabs 24A, and the second multifunction strap 26 including the second plurality of multifunction strap tabs 26A may be manufactured from a flexible material, for example but not limited to a high density polyester.

As illustrated in FIG. 2 and FIG. 2A, a curtain airbag assembly 20 includes a rolled airbag cushion 22, a first multifunction strap 24, and a second multifunction strap 26.

A plurality of cushion tabs 22A are arranged along a length L of the rolled airbag cushion 22. The first multifunction strap 24 is arranged at a first location L1 along the length L of the rolled airbag cushion 22. The second multifunction strap 26 is arranged at a second location L2 along the length L of the rolled airbag cushion 22. The second location L2 is arranged adjacent to a rear end 23B of the curtain airbag system 20, while the first location L1 is arranged forward in vehicle (FIV) of the second location L2 towards a front end 23A of the curtain airbag system 20.

The first multifunction strap 24 includes a first plurality of multifunction strap tabs 24A, and a first multifunction strap attachment 24B. The second multifunction strap 26 include a second plurality of multifunction strap tabs 26A, and a second multifunction strap attachment 26B.

The first multifunction strap 24 includes a B-pillar ramp portion 19A, and the second multifunction strap 26 includes a C-pillar ramp portion 19B. The B-pillar ramp portion 19A, which is integrated into the first multifunction strap 24 to facilitate over garnish trim deployment, is wrapped around the rolled airbag cushion 22 adjacent to the B-pillar 16, while the C-pillar ramp portion 19B, which is integrated into the second multifunction strap 26, is wrapped around the rolled airbag cushion 22 adjacent to the C-pillar 18.

The rolled airbag cushion 22 includes a first longitudinal portion LP1, and a second longitudinal portion LP2. The first longitudinal portion LP1 of the rolled airbag cushion 22 is arranged at least partially within the first multifunction strap 24, while the second longitudinal portion LP2 of the rolled airbag cushion 22 is arranged at least partially within the second multifunction strap 26.

The plurality of cushion tabs 22A includes a first plurality of cushion tabs 22A-1 arranged along the first longitudinal portion LP1 of the rolled airbag cushion 22, and a second plurality of cushion tabs 22A-2 arranged along the second longitudinal portion LP2 of the rolled airbag cushion 22.

Referring now to FIG. 3, FIG. 3A-1, FIG. 3A-2, and FIG. 3, 3B, with continued reference to FIG. 1, FIG. 2, and FIG. 2A, each of the first plurality of cushion tabs 22A-1 is arranged adjacent to a respective one of the first plurality of multifunction strap tabs 24A. Each of the second plurality of cushion tabs 22A-2 is arranged adjacent to a respective one of the second plurality of multifunction strap tabs 26A.

As illustrated in FIG. 3A-1, the first plurality of multifunction strap tabs 24A includes a first portion 31A, a second portion 33A, and a first perforated hinge 30A, which may be arranged between the first portion 31A and the second portion 33A of each of the first plurality of multifunction tabs 24A.

First fastener openings 32A are arranged within the first portion 31A, and the second portion 33A of the first plurality of multifunction strap tabs 24A, while second fastener opening 32B are arranged within the first portion 33A, and the second portion 33A of the second plurality of multifunction strap tabs 26A.

It should be appreciated that while each of the first plurality of multifunction strap tabs 24A, and the second plurality of multifunction strap tabs 26A are shown with two first fastener openings 32A arranged within the first portion 31A respectively, and two second fastener openings 32B arranged within the second portion 33A respectively, as illustrated in FIG. 3A-1, each of the first plurality of multifunction strap tabs 24A-2, and the second plurality of multifunction strap tabs 26A-2 may include more than two first fastener openings 32A, 32A-1 arranged within the first portion 31A-1 respectively, and more than two fastener openings 32B, 32B-1 arranged within the second portion 33A-1 respectively, as illustrated in FIG. 3A-2, depending on individual application requirements.

As illustrated in FIG. 3B, each of the first plurality of cushion tabs 24A is arranged between the first portion and the second portion of the respective one of the first plurality of multifunction strap tabs.

Referring back to FIG. 3A-1, the second plurality of multifunction strap tabs 26A includes a first portion 31A, a second portion 33A, and a second perforated hinge 30A, which is arranged between the first portion 31A and the second portion 33A of each of the second plurality of multifunction tabs 26A.

Referring back to FIG. 3B, each of the second plurality of cushion tabs 26A is arranged between the first portion 31A and the second portion 33A of the respective one of the second plurality of multifunction strap tabs 26A.

The first portion 31A and the second portion 33A of each of the first plurality of multifunction strap tabs 24A, and the respective one of the first plurality of cushion tabs 22A-1 includes a first fastener opening 32A extending through the first portion and the second portion of each of the first plurality of multifunction strap tabs 24A.

The first portion 31A and the second portion 33A of each of the second plurality of multifunction strap tabs 26A, and the respective one of the second plurality of cushion tabs 22B includes a second fastener opening 32B extending through the first portion 31A and the second portion 33B of each of the second plurality of multifunction strap tabs 26A.

A fastener 42 is arranged within each of the first fastener openings 32A and the second fastener openings 32B, while a fastener retention washer (not shown) is arranged to retain each of the fasteners 42 within each of the first fastener openings 32A and the second fastener openings 32B.

Each of the first plurality of multifunction strap tabs 24A is folded along a respective one of first perforated hinges 30A, while each of the second plurality of multifunction strap tabs 26A folded along a respective one of the second perforated hinges 30B.

Each of the first multifunction strap 24 and the second multifunction strap 26 is attached to the folded airbag cushion 22, at least in part, via sewing.

Each of the first multifunction strap attachment 24B and the second multifunction strap attachment 24B includes a tape 24B, 26B, for example but not limited to an adhesive tape.

According to another aspect of the disclosure, a curtain airbag system 20 for a vehicle 10 includes a rolled airbag cushion 22 having a plurality of cushion tabs 22A arranged along a length L of the rolled airbag cushion 22.

As illustrated in FIG. 3, the rolled airbag cushion 22 includes an outer non-inflatable portion 25 having an upper airbag selvage portion 35, an inner inflatable portion 27 arranged within the outer non-inflatable portion 25, a first multifunction strap 24, a second multifunction strap 26, an inflator 28, and an A-pillar tether anchor 36.

The plurality of cushion tabs 24A, 26A extends from the upper airbag selvage portion 35 of the outer non-inflatable portion 25 of the rolled airbag cushion 22.

The first multifunction strap 24 is arranged at a first location L1 along the length L of the rolled airbag cushion 22, and includes a first plurality of multifunction strap tabs 24A, an inflator attachment feature 39, and a first multifunction strap attachment 24B.

The second multifunction strap 26 is arranged at a second location L2 along the length L of the rolled airbag cushion 22, and includes a second plurality of multifunction strap tabs 26A, and a second multifunction strap attachment 26B.

The inflator 28 is arranged adjacent to the inflator attachment feature 39 of the rolled airbag cushion 22, while the A-pillar tether anchor 36 extends from a front end 23A of the curtain airbag assembly 20.

The A-pillar tether anchor 36 is configured for attachment to an A-pillar 14 of the vehicle 10.

The rolled airbag cushion 22 includes a first longitudinal portion LP1, and a second longitudinal portion LP2. The first longitudinal portion LP1 is arranged at least partially within the first multifunction strap 24, while the second longitudinal portion LP2 is arranged at least partially within the second multifunction strap 26.

Each of the first multifunction strap 24 and the second multifunction strap 26 is attached to the folded airbag cushion 22, at least in part, via sewing.

Each of the first multifunction strap attachment and the second multifunction strap attachment may include a tape.

According to another aspect of the disclosure, a vehicle 10 including a curtain airbag system 20 as discussed above is also disclosed herein.

The vehicle 10 includes a roof rail 12, an A-pillar 14, a B-pillar 16, a C-pillar 18, and the curtain airbag system 20 mounted to the roof rail 12 via fasteners 42 as discussed above.

By providing a curtain airbag system including a multifunction strap that combines the functions of a plastic ramp, tab stiffeners, twist prevention features, fastener retention washers, and fabric patches into a multifunction strap, system complexity is reduced while ensuring proper airbag cushion deployment over the garnish trim, facilitating error-proof installation and providing assembly aid for secure one-handed screw operation at the vehicle assembly plant, protecting airbag cushion fabric from damage, and retaining fasteners during curtain airbag system assembly, shipping and handling.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A curtain airbag system for a vehicle comprising:
a rolled airbag cushion having a plurality of cushion tabs arranged along a length of the rolled airbag cushion;
a first multifunction strap arranged at a first location along the length of the rolled airbag cushion, wherein the first multifunction strap includes:
a first plurality of multifunction strap tabs, wherein the first plurality of multifunction strap tabs includes:
a first portion;
a second portion; and
a first perforated hinge arranged between the first portion and the second portion of each of the first plurality of multifunction tabs; and
a first multifunction strap attachment;
a second multifunction strap arranged at a second location along the length of the rolled airbag cushion, wherein the second multifunction strap includes:
a second plurality of multifunction strap tabs, wherein the second plurality of multifunction strap tabs includes:
a first portion;
a second portion; and
a second perforated hinge arranged between the first portion and the second portion of each of the second plurality of multifunction tabs; and
a second multifunction strap attachment.

2. The curtain airbag system as recited in claim 1, wherein the rolled airbag cushion includes:
a first longitudinal portion arranged at least partially within the first multifunction strap; and
a second longitudinal portion arranged at least partially within the second multifunction strap.

3. The curtain airbag system as recited in claim 2, wherein the plurality of cushion tabs includes:
a first plurality of cushion tabs arranged along the first longitudinal portion of the rolled airbag cushion, wherein each of the first plurality of cushion tabs is arranged adjacent to a respective one of the first plurality of multifunction strap tabs; and
a second plurality of cushion tabs arranged along the second longitudinal portion of the rolled airbag cushion, wherein each of the second plurality of cushion tabs is arranged adjacent to a respective one of the second plurality of multifunction strap tabs.

4. The curtain airbag system as recited in claim 3, wherein each of the first plurality of cushion tabs is arranged between the first portion and the second portion of the respective one of the first plurality of multifunction strap tabs; and
wherein each of the second plurality of cushion tabs is arranged between the first portion and the second portion of the respective one of the second plurality of multifunction strap tabs.

5. The curtain airbag system as recited in claim 4, wherein the first portion and the second portion of each of the first plurality of multifunction strap tabs, and the respective one of the first plurality of cushion tabs includes a first fastener opening extending through the first portion and the second portion of each of the first plurality of multifunction strap tabs; and
wherein the first portion and the second portion of each of the second plurality of multifunction strap tabs, and the respective one of the second plurality of cushion tabs includes a second fastener opening extending through the first portion and the second portion of each of the second plurality of multifunction strap tabs.

6. The curtain airbag system as recited in claim 5, including a fastener arranged within each of the first fastener openings and the second fastener openings.

7. The curtain airbag system as recited in claim 3, wherein each of the first plurality of multifunction strap tabs is folded along a respective one of first perforated hinges; and
wherein each of the second plurality of multifunction strap tabs is folded along a respective one of second perforated hinges.

8. The curtain airbag system as recited in claim 1, wherein each of the first multifunction strap and the second multifunction strap is attached to the rolled airbag cushion, at least in part, via sewing.

9. The curtain airbag system as recited in claim 1, wherein each of the first multifunction strap attachment and the second multifunction strap attachment includes a tape.

10. A curtain airbag system for a vehicle comprising:
a rolled airbag cushion having a plurality of cushion tabs arranged along a length of the rolled airbag cushion, wherein the rolled airbag cushion includes:
an outer non-inflatable portion having an upper airbag selvage portion; and
an inner inflatable portion arranged within the outer non-inflatable portion,
wherein the plurality of cushion tabs extend from the upper airbag selvage portion;
a first multifunction strap arranged at a first location along the length of the rolled airbag cushion, wherein the first multifunction strap includes:
a first plurality of multifunction strap tabs;
an inflator attachment feature; and
a first multifunction strap attachment; and
a second multifunction strap arranged at a second location along the length of the rolled airbag cushion, wherein the second multifunction strap includes:
a second plurality of multifunction strap tabs; and
a second multifunction strap attachment; and
an inflator arranged adjacent to the inflator attachment feature of the rolled airbag cushion; and
an A-pillar tether anchor extending from a front end of the curtain airbag system, the A-pillar tether anchor configured for attachment to an A-pillar of the vehicle.

11. The curtain airbag system as recited in claim 10, wherein the rolled airbag cushion includes:
a first longitudinal portion arranged at least partially within the first multifunction strap; and
a second longitudinal portion arranged at least partially within the second multifunction strap.

12. The curtain airbag system as recited in claim 10, wherein each of the first multifunction strap and the second multifunction strap is attached to the rolled airbag cushion, at least in part, via sewing.

13. The curtain airbag system as recited in claim 10, wherein each of the first multifunction strap attachment and the second multifunction strap attachment includes a tape.

14. A vehicle comprising:
a vehicle body having a roof rail;
a curtain airbag system attached to the roof rail, the curtain airbag system including:
a rolled airbag cushion having a plurality of cushion tabs arranged along a length of the rolled airbag cushion;

a first multifunction strap arranged at a first location along the length of the rolled airbag cushion, wherein the first multifunction strap includes:

a first plurality of multifunction strap tabs, wherein the first plurality of multifunction strap tabs includes:

a first portion;

a second portion; and a first perforated hinge arranged between the first portion and the second portion of each of the first plurality of multifunction tabs; and a first multifunction strap attachment;

a second multifunction strap arranged at a second location along the length of the rolled airbag cushion, wherein the second multifunction strap includes:

a second plurality of multifunction strap tabs, wherein the second plurality of multifunction strap tabs includes:

a first portion;

a second portion; and a second perforated hinge arranged between the first portion and the second portion of each of the second plurality of multifunction tabs; and a second multifunction strap attachment.

15. The vehicle as recited in claim 14, wherein the rolled airbag cushion includes:

a first longitudinal portion arranged at least partially within the first multifunction strap; and a second longitudinal portion arranged at least partially within the second multifunction strap.

16. The vehicle as recited in claim 15, wherein the plurality of cushion tabs includes:

a first plurality of cushion tabs arranged along the first longitudinal portion of the rolled airbag cushion, wherein each of the first plurality of cushion tabs is arranged adjacent to a respective one of the first plurality of multifunction strap tabs; and a second plurality of cushion tabs arranged along the second longitudinal portion of the rolled airbag cushion, wherein each of the second plurality of cushion tabs is arranged adjacent to a respective one of the second plurality of multifunction strap tabs.

17. The vehicle as recited in claim 16, wherein each of the first plurality of cushion tabs is arranged between the first portion and the second portion of the respective one of the first plurality of multifunction strap tabs, and wherein each of the second plurality of cushion tabs is arranged between the first portion and the second portion of the respective one of the second plurality of multifunction strap tabs.

18. The vehicle as recited in claim 17, wherein the first portion and the second portion of each of the first plurality of multifunction strap tabs, and the respective one of the first plurality of cushion tabs includes a first fastener opening extending through the first portion and the second portion of each of the first plurality of multifunction strap tabs; and wherein the first portion and the second portion of each of the second plurality of multifunction strap tabs, and the respective one of the second plurality of cushion tabs includes a second fastener opening extending through the first portion and the second portion of each of the second plurality of multifunction strap tabs.

19. The vehicle as recited in claim 18, including a fastener arranged within each of the first fastener openings and the second fastener openings.

20. The vehicle as recited in claim 14, wherein each of the first multifunction strap attachment and the second multifunction strap attachment includes a tape.

* * * * *